United States Patent [19]
[11] 4,129,678
Seki et al.
[45] Dec. 12, 1978

[54] SELF-BONDABLE INSULATED WIRES COMPRISING THREE COATINGS INCLUDING A PHENOXY RESIN OUTER LAYER

[75] Inventors: Masatoshi Seki, Kodaira; Moriichi Sato, Hitachi; Hideo Tsukioka, Mito; Etuo Ohe, Hitachi; Masatsugu Ogata, Hitachi; Akio Mitsuoka, Hitachi, all of Japan

[73] Assignees: Hitachi, Ltd.; Hitachi Cable, Ltd., both of Japan

[21] Appl. No.: 800,788

[22] Filed: May 26, 1977

[30] Foreign Application Priority Data

Jun. 2, 1976 [JP] Japan ................................ 51-63624

[51] Int. Cl.$^2$ ....................... B32B 15/02; B32B 15/08; H01B 3/36

[52] U.S. Cl. .............................. 428/383; 174/110 SR

[58] Field of Search ..................... 260/75 N; 428/383; 174/110 SR

[56] References Cited

U.S. PATENT DOCUMENTS

| | | | |
|---|---|---|---|
| 3,516,858 | 6/1970 | Fitzhugh et al. | 428/383 |
| 3,523,820 | 8/1970 | Sheffer | 428/383 |
| 3,528,852 | 9/1970 | Olson et al. | 428/383 |
| 3,822,147 | 7/1974 | Koerner et al. | 428/383 |
| 3,917,892 | 11/1975 | Kawaguchi et al. | 260/75 N |
| 3,922,465 | 11/1975 | Kawaguchi et al. | 260/75 N |
| 3,944,706 | 3/1976 | Ezdjka | 428/383 |
| 3,953,649 | 4/1976 | Suzuki et al. | 428/383 |
| 3,975,571 | 8/1976 | Kawaguchi et al. | 428/383 |
| 4,012,555 | 3/1977 | Keske | 260/75 N |

*Primary Examiner*—J.C. Cannon
*Attorney, Agent, or Firm*—Craig & Antonelli

[57] ABSTRACT

In a self-bondable insulated wire comprising a conductor and three resin insulating layers, the first resin insulating layer is formed with a resin selected from the group consisting of polyimide resins, polyamideimide resins and polyesterimide resins, the intermediate resin insulating layer is formed with a resin selected from the group consisting of polyvinyl formal resins and epoxy resins, and the outermost resin insulating layer is formed with a self-bondable resin of phenoxy series. Thus, a self-bondable insulated wire which is excellent in both oil resistance and heat resistance is obtained.

10 Claims, No Drawings

SELF-BONDABLE INSULATED WIRES COMPRISING THREE COATINGS INCLUDING A PHENOXY RESIN OUTER LAYER

The present invention relates to self-bondable insulated wires. More particularly, the invention pertains to self-bondable insulated wires which are excellent in oil resistance and heat resistance and which make a contribution to an improvement of the mechanical strength of coils in a transformer, a rotary machine, etc.

In the self-bondable insulated wires, a self-bondable varnish layer provided as the outer layer of an insulated wire has a function of bonding and hardening between the insulated wires by solvent treatment or heating treatment, etc. after assembling of a coil, etc. Thereby, it is possible to improve the mechanical strength of an insulated wire in a bundle such as a winding.

As the self-bondable insulated wire, there have heretofore been known one obtained by coating and baking directly onto a conductor a self-bondable varnish layer of a polyvinyl butyral resin, a polyamide resin, etc. and one obtained by coating and baking the above-mentioned self-bondable varnish onto an insulated wire such as a polyvinyl formal-insulated wire, a polyurethane-insulated wire, etc. In the thus produced self-bondable insulated wires, the above-mentioned self-bondable varnish layers of polyvinyl butyral resins, polyamide resins, etc. coated and baked directly onto copper as a conductor are unsatisfactory in adhesive strength when used in oils at high temperatures. Also, when the above-mentioned self-bondable varnish layer is provided on a polyvinyl formal- or polyurethane-insulated wire, etc., adhesive strength between the conductor and the inner insulating resin layer or between the insulating resin layer and the self-bondable varnish layer is unsatisfactory when used in oils at high temperatures. Thus, the function as a self-bondable insulated wire can not often be displayed enough. When used in oils at high temperatures, the adhesive strength between the insulated wires decreases between any two of the conductor, the inner insulating resin layer and the self-bondable varnish layer, and high mechanical strengths as a coil using the self-bondable insulated wire can not be obtained.

For example, Japanese Patent Kokoku (Post-Exam. Publn.) No. 19,072/74 discloses a self-bondable insulated wire comprising a conductor, the first layer of a heat-resistant resin selected from the group consisting of polyesteramide-imide resins, polyamide-imide resins and polyimide resins, and the outer thermoplastic bondable coating layer of a linear aromatic polysulfone resin, but the self-bondable insulated wire has a defect in that the curing temperature therefor is as too high as 200° to 260° C. Also, Japanese Patent Kokoku (Post-Exam. Publn.) No. 30,749/73 discloses a self-moldable insulated wire comprising a conductor, the first coating layer of a thermosetting polyester resin, the second coating layer of a polyaromatic polycarboxyl aromatic imide resin, and the outer layer of a thermoplastic polyester resin, but the self-bondable insulated wire is not practicable owing to its poor oil resistance.

Therefore, an object of the present invention is to provide a self-bondable insulated wire which is excellent in both oil resistance and heat resistance.

Another object of the invention is to provide a self-bondable insulated wire which can give excellent adhesive strength between elemental wires.

The other objects and advantages of the present invention will be apparent from the following description.

According to the present invention, there is provided a self-bondable insulated wire comprising a conductor and three resin insulating layers, characterized in that the first resin insulating layer is formed with a resin selected from the group consisting of polyimide resins, polyamideimide resins and polyesterimide resins, the intermediate resin insulating layer is formed with a resin selected from the group consisting of polyvinyl formal resins and epoxy resins, and the outermost resin insulating layer is formed with a self-bondable resin of phenoxy series.

It is required for the resin forming the first layer to be resistant to heat and oil. From this point of view, the resin is selected from the group consisting of polyimide resins, polyamideimide resins and polyesterimide resins.

It is required for the resin forming the intermediate layer to be compatible with both the resin forming the outermost layer and the resin forming the first layer, to have high adhesiveness to these resin layers particularly in oils at high temperatures, and to be resistant to heat and oil. According to the present invention, it has been found that polyvinyl formal resins and epoxy resins have such properties.

It is required for the resin forming the outermost layer to be a self-bondable resin. As such resins, phenoxy resins are selected.

The resins forming these respective layers are applied by coating and baking on a conductor successively in the same manner as in the production of known multilayer self-bondable insulated wires. The thus obtained self-bondable wires are characterized by excellent adhesive strength and mechanical strengths as mentioned below.

As for the thickness of the three resin insulating layers as provided on a conductor, the thickness of the whole layer depends upon JIS standard. However, the ratio of thickness of the respective layers can be varied properly.

The thickness of the first layer can be varied within such a range as can endure operations such as coil winding, assembling, etc. from a viewpoint of utilizing its oil resistance and heat resistance. However, a tendency to reduce the adhesiveness between the conductor and the resin insulating layer has rather been observed when the thickness is increased.

A ratio of the thickness of the first layer to that of the intermediate layer is preferably 5–45:95–55, and particularly preferably 10–35:90–65. Thereby, the intermediate layer can maintain enough adhesive strength at high temperatures.

The outer layer once melts by the self-bondability of the resin, that is, by heating, but then solidifies. In order to utilize this property, the thickness of the outer layer is preferably at least 0.02 mm. If it is less than 0.02 mm, it is impossible to maintain satisfactory adhesiveness.

The resins forming the first layer, the intermediate layer and the outer layer will be explained below.

As the polyimide resins used in the first layer, are mentioned resins obtained by a reaction between a tetracarboxylic acid anhydride and a diamine or by a reaction between a tetracarboxylic acid anhydride and a diisocyanate. Tetracarboxylic acid anhydrides are represented by the general formula

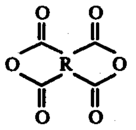

wherein R is a tetravalent group having at least 4 carbon atoms, which is preferably an aliphatic group, an alicyclic group or an aromatic group and is particularly preferably a group containing an aromatic nucleus. Also, four carboxyl groups respectively bond to different carbon atoms and each two of them are bonded to positions adjacent to each other.

Examples of such tetracarboxylic acid anhydrides include pyromellitic acid anhydride, 2,3,6,7-naphthalene-tetracarboxylic acid anhydride, 3,3′,4,4′-diphenyltetracarboxylic acid anhydride, 2,2′,3,3′-diphenyl-tetracarboxylic acid anhydride, 2,2-bis(3,4-dicarboxyphenyl)propane anhydride, bis(3,4-dicarboxyphenyl)-sulfone anhydride, perylene-3,4,9,10-tetracarboxylic acid anhydride, benzophenone-3,3,4,4-tetracarboxylic acid anhydride, bis(3,4-dicarboxyphenyl)methane anhydride, etc.

Diamines are generally represented by the general formula $$H_2N-R-NH_2$$

wherein R is a bivalent group having at least 2 carbon atoms, and preferably a bivalent aliphatic, alicyclic or aromatic group, and two amino groups are preferably not adjacent to each other.

Examples of such a diamine include aliphatic diamines such as ethylenediamine, trimethylenediamine, tetramethylenediamine, pentamethylenediamine, hexamethylenediamine, heptamethylenediamine, octamethylene-diamine, nonamethylenediamine, decamethylenediamine, etc., and aromatic diamines such as p-xylylenediamine, m-phenylenediamine, p-phenylenediamine, m-toluylene-diamine, benzidine, 4,4′-diaminodiphenylmethane, 4,4′-diaminodiphenylpropane, 3,3′-dimethyl-4,4′-diaminodiphenylmethane, 3,3′-dichlorobenzidine, 4,4′-dichlorobenzidine, 4,4′-diaminodiphenylsulfide, 3,3′-diaminodiphenylsulfone, 4,4′-diaminodiphenylsulfone, 4,4′-diaminodiphenylether, 3,3′-diaminodiphenylsulfoxide, 4,4′-diaminodiphenylsulfoxide, 3,3′-diaminodiphenyl-thioether, 1,5-diaminonapthalene, 3,3′-dimethyl-4,4′-bisphenyldiamine, 3,3′-dimethoxybenzidine, 2,4′-bis-(p-amino-tert-butyl)-toluene, 1,4-bis-(3-methyl-5-aminophenyl)-benzene, 1-isopropyl-2,4-m-phenylene-diamine, bis-(4-aminophenyl)-α,α′-p-xylene, bis-(4-aminophenyl)-1,4-benzene, etc.

Diisocyanates are represented by the general formula $$OCN-R-NCO$$

wherein R is a bivalent group having at least 2 carbon atoms, and preferably a bivalent aliphatic, alicyclic or aromatic group, and two isocyanate groups are preferably not bonded to positions adjacent to each other.

Examples of such a diisocyanate include tetramethylene-(1,4)-diisocyanate, hexamethylene-(1,6)-diisocyanate, cyclohexane-(1,4)-diisocyanate, dicyclohexyl-(4,4′)-diisocyanate, phenylene-(1,3)-diisocyanate, phenylene-(1,4)-diisocyanate, toluylene-(2,6)-diisocyanate, toluylene-(2,4)-diisocyanate, diphenylmethane-(4,4′)-diisocyanate, diphenylether-(4,4′)-diisocyanate, napthalene-(1,5)-diisocyanate, hexahydrodiphenyl-4,4′-diisocyanate, triphenylmethane-4,4′-diisocyanate, 1-methoxybenzene-4,4′-diisocyanate, azobenzene-4,4′-diisocyanate, ω,ω′-dipropyletherdiisocyanate, diphenylsulfide-2,4-diisocyanate, anthraquinone-2,6-diisocyanate, etc.

The polyamideimide resins are those obtained by a reaction between a tricarboxylic acid anhydride and a diamine [see Japanese Patent Kokoku (Post-Exam. Publn.) No. 15,637/67] or a reaction between a tricarboxylic acid anhydride and a diisocyanate [see Japanese Patent Kokoku (Post-Exam. Publn.) No. 8,910/65 and Japanese Patent Kokoku (Post-Exam. Publn.) No. 19,302/66]. Tricarboxylic acid anhydrides are represented by the general formula

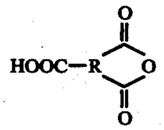

wherein R is a trivalent group having at least 3 carbon atoms, which is preferably aliphatic, alicyclic or aromatic, and particularly preferably contains an aromatic nucleus, and three carboxyl groups shall respectively bonded to different carbon atoms, two of them being bonded to positions adjacent to each other and the other one being preferably bonded to a non-adjacent position.

Examples of such a tricarboxylic acid anhydride include trimellitic acid anhydride, 2,3,6-naphthalene-tricarboxylic acid anhydride, 2,3,5-naphthalenetricarboxylic acid anhydride, 2,2′,3-biphenyltricarboxylic acid anhydride, 2-(3,4-dicarboxyphenyl)-2-(4-carboxyphenyl)propane anhydride, 2-(2,3-dicarboxyphenyl)-2-(3-carboxyphenyl)propane anhydride, 1,2,4-napthalene-tricarboxylic acid anhydride, 1,2,5-naphthalenetricarboxylic acid anhydride, 1-(2,3-dicarboxyphenyl)-1-(3-carboxyphenyl)ethane anhydride, 1-(3,4-dicarboxyphenyl)-1-(4-carboxyphenyl)ethane anhydride, (2,3-dicarboxyphenyl)-(2-carboxyphenyl)methane anhydride, (2,3-dicarboxyphenyl)-(3-carboxyphenyl)methane anhydride, 1,2,3-benzenetricarboxylic acid anhydride, 3,3,4-tricarboxybenzophenone anhydride, etc.

As the diamines and diisocyanates to be reacted with tricarboxylic acid anhydrides, the above-mentioned diamines and diisocyanates may be used likewise.

As the polyesterimide resins, there are mentioned resins obtained by a reaction between a reaction product of a tricarboxylic acid anhydride with a dihydric alcohol or a dihydric phenol and a diamine or a diisocyanate and resins obtained by a reaction between a reaction product of a tetracarboxylic acid anhydride with an aminocarboxylic acid or aminoalcohol and a polyhydric alcohol, a polyhydric phenol or a dicarboxylic acid. As the tricarboxylic acid anhydrides, said tricarboxylic acid anhydrides regarding the polyamideimide resins may be used likewise.

Dihydric alcohols or phenols among polyhydric alcohols or phenols are preferably represented by the general formula $$HO-R-OH$$

wherein R is a bivalent group having at least 2 carbon atoms, and particularly preferably a bivalent aliphatic, alicyclic or aromatic group, and two hydroxyl groups are not adjacent to each other Such a dihydric alcohol or phenol is exemplified by ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, resorcinol, hydroquinone, 1,4-dihydroxynaphthalene, 1,5-dihydroxy-naphthalene, naphthoresorcinol, diphenol, 4,4'-dihydroxy-benzophenone, 4,4'-dihydroxydiphenylether, 4,4'-dihydroxydiphenylsulfone, 4,4'-dihydroxydiphenylmethane, 4,4'-dihydroxydiphenylpropane, 4,4'-dihydroxydiphenyl-thioether, 3,3'-dimethyl-4,4'-dihydroxydiphenylpropane, 2,2'-dimethyl-4,4'-dihydroxydiphenylpropane, 3,3'-dimethyl-4,4'-dihydroxydiphenylmethane, 2,2'-dimethyl-4,4'-dihydroxydiphenylmethane, etc.

Also, the polyhydric alcohol, that is, a tri- or more-hydric alcohol is exemplified by glycerol, tris(2-hydroxyethyl)isocyanurate, trimethylolpropane, hexanetriol, etc.

As the diamine, the above-mentioned diamines with regard to the polyimide resins may be used likewise.

Also, as the diisocyanate, the above-mentioned diisocyanates with regard to the polyimide resins may be used likewise.

As the tetracarboxylic acid anhydride used in another process of preparation, the above-mentioned tetracarboxylic acid anhydrides with regard to the polyimide may be used likewise.

The aminocarboxylic acids are represented by the general formula $$H_2N - R - COOH$$

wherein R is a bivalent group having at least 3 carbon atoms, and preferably an aliphatic, alicyclic or aromatic group, amino group and carboxyl group being respectively bonded to different carbon atoms and being preferably non-adjacent to each other.

Such an aminocarboxylic acid is exemplified by compounds represented by the general formulae $$H_2N - (CH_2)_n - COOH$$

wherein n is a positive integer and is usually 10 or less,

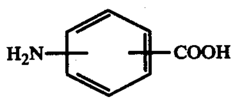

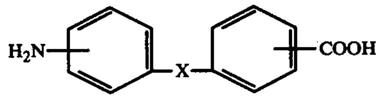

wherein X is a carbon-carbon bond directly bonding aromatic nuclei, an alkylene group, —O—, —NH—, —CO—, —$SO_2$—, —SO— or —S—,

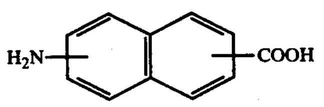

-continued

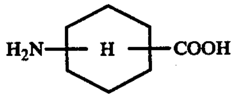

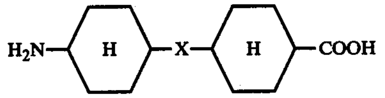

wherein X is as defined above, and

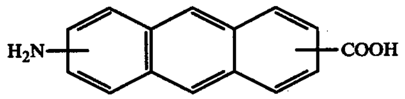

As the dihydric alcohol, the above-mentioned dihydric alcohols with regard to the polyesterimide resins may be used likewise.

The bivalent carboxylic acids are represented by the general formula $$HOOC - R - COOH$$

wherein R is a bivalent group having at least 2 carbon atoms, and preferably a bivalent aliphatic, alicyclic or aromatic group, the two carboxyl groups being bonded to different carbon atoms and being preferably non-adjacent.

Such a bivalent carboxylic acid is exemplified by succinic acid, glutaric acid, adipic acid, pimellitic acid, suberic acid, azelaic acid, sebacic acid, 2,6-naphthalenedicarboxylic acid, 2,7-naphthalenedicarboxylic acid, 1,5-naphthalenedicarboxylic acid, terephthalic acid, isophthalic acid, 4,4'-dicarboxybenzophenone, 4,4'-dicarboxydiphenylether, 4,4'-dicarboxydiphenylmethane, 3,3'-dicarboxydiphenylmethane, 4,4'-dicarboxy-diphenylsulfone, 4,4'-dicarboxydiphenylsulfide, 4,4'-dicarboxydiphenylthioether, 4,4'-dicarboxydiphenyl-propane, 3,3'-dimethyl-4,4'-dicarboxydiphenylmethane, 4,4'-dicarboxybiphenyl, etc.

As the polyvinyl formal resins used as the intermediate layer, there are mentioned resins obtained by a reaction between a polyvinyl alcohol and formalin. As a curing agent therefor, there may be used phenolformaldehyde prepolymer which has heretofore been widely used and similar amino resins, isocyanate compounds, etc. to those used as a curing agent for epoxy resins. Further, epoxy resins themselves may be used. It is desirable from a viewpoint of working property that isocyanate compounds are used by subjecting to addition reaction with trimethylolpropane, trimethylolethane, etc. and then stabilizing with phenol, cresol, etc., that is, in the form of a so-called isocyanate generator.

As the epoxy resins forming the intermediate layer, for example, resins obtained by copolycondensation of epichlorohydrin and bisphenol A, Epikote 1001, 1002, 1004, 1007, 1009 (trademark of Shell Oil. Co. in U.S.A.), DER 661-J, 664-J, 667-J, 669-J (trademark of Dow Chemical Corp. in U.S.A.), etc. are commercially available.

As a curing agent for the epoxy resins, there are mentioned not only curing agents generally used for molding such as aliphatic, alicyclic or aromatic polybasic acid anhydrides, diamines, etc. but also polyesters obtained by condensation of a polybasic acid and a polyhydric alcohol and amino resins such as melamine-formaldehyde precondensates and urea-formaldehyde precondensates, etc. Also, when heat resistance and solvent resistance are strongly requested, it is possible to use the above-mentioned isocyanate compounds.

As the third layer, that is, the outermost layer in the present invention, a resin layer having self-bondability is provided. As this kind of resins, there are used, for example, ones consisting mainly of a phenoxy resin and blended with an epoxy resin or a stabilized isocyanate (a polyfunctional isocyanate compound stabilized with phenol or cresol) [see Japanese Patent Kokai (Laid-Open) No. 12,387/74], and ones obtained by adding as the third component to the above-mentioned resins a reaction catalyst, for example, a known curing catalyst for epoxy resins such as a tertiary amine, a $BF_3$-amine complex, and ones obtained by adding further thereto a modifier in such an amount as does not so reduce their heat resistance.

Further, phenoxy resin compositions containing a stabilized isocyanate and a thermoplastic polyester resin [see Japanese Patent Kokai (Laid-Open) No. 6,482/74], phenoxy resin compositions containing an epoxidized novolac resin and an epoxy ring-opening catalyst (see Japanese Patent Application No. 103,050/74) and phenoxy resin compositions containing a novolac-type epoxy resin, an epoxy resin as a flexibility imparting agent and an epoxy ring-opening catalyst (see Japanese Patent Application No. 61,935/75) may be used.

The three kinds of resins forming the first layer, the intermediate layer and the outer layer are respectively coated and baked successively and continuously, but baking temperature for the first layer and the intermediate layer is, for example, 400° C. at a delivery speed of 4 m/min and that for the self-bondable layer is 250° C. at a delivery speed of 5 m/min.

The present invention will be explained below referring to examples, but the present invention is never limited to the examples. Preparation examples of resins forming each layer used in the examples are shown as follows:

PREPARATION EXAMPLE 1

Polyimide (polyamic acid varnish)

In 100 ml of N-methylpyrrolidone is dissolved 0.1 mole of m-phenylenediamine. To the solution is added 0.1 mole of pyromellitic acid dianhydride in small portions with stirring. Throughout all the operations (about 40 minutes) the reactor is cooled by water at about 15° C. circulating through an outer jacket. The last part of the dianhydride is added together with 15 ml of N-methylpyrrolidone. To the thus obtained solution is further added N-methyl-pyrrolidone so that a 16.5% by weight polymer solution may be formed. Thus, a polyamic acid solution is obtained.

PREPARATION EXAMPLE 2

Polyamideimide (polyimideamide varnish)

In 200 ml of N,N'-dimethylacetamide is dissolved 0.2 mole of diphenylmethane diisocyanate. To this solution is added 37 g of trimellitic acid anhydride dissolved in 200 ml of N,N'-dimethylacetamide. The temperature increases to 80°–100° C. and the reaction mixture is violently reacted with the generation of carbon dioxide. The temperature is further increased and stirring is carried out at 125°–135° C. for about 1 hour. The color of the solution changes from colorless to yellow and red, and the viscosity of the solution increases remarkably. Heating is continued for about 2 hours and the reaction is stopped. After the completion of the reaction, N,N'-dimethylacetamide is further added to form a 30% by weight polymer solution.

PREPARATION EXAMPLE 3

Polyesterimide

To 192 g (1 mole) of trimellitic acid anhydride in 300 ml of N-methylpyrrolidone is added 98 g (0.5 mole) of m-phenylenediamine in 300 ml of N-methylpyrrolidone. Then, 99 g of tris(2-hydroxyethyl)isocyanurate, 165 g of ethylene glycol, 388 g of dimethyl terephthalate and 0.0345 g of litharge (as a catalyst) are added. When the mixture is heated to 220° to 230° C., an orange solid is formed and suspended in the mixture. Heating is continued until the mixture becomes clear. After the completion of the reaction, m-cresol is added so that the resin content may become 27% by weight.

PREPARATION EXAMPLE 4

Formal paint

To m-cresol and solvent naphtha are added 100 parts by weight of a polyvinyl formal resin (Vinylex F manufactured by Chisso), 30 parts by weight of a resol-type phenol resin, 50 parts by weight of trimethylolpropane-added phenol-stabilized toluylene diisocyanate compound, 30 parts by weight of an epoxy resin of a molecular weight of 2900 produced from bisphenol A and epichlorohydrin (Epikote 1007 manufactured by Shell Oil Co. in U.S.A.) and 20 parts by weight of a urea-formaldehyde resin so that the resin content may become 20% by weight. Thus, a formal paint is obtained.

PREPARATION EXAMPLE 5

Epoxy paint

In m-cresol are dissolved 100 parts by weight of an epoxy resin (Epikote 1007 manufactured by Shell Oil Co. in U.S.A., epoxide equivalent 2250), 50 parts by weight of a polyester resin produced from glycerol and adipic acid, 5 parts by weight of a melamineformaldehyde resin and 10 parts by weight of trimethylolpropane-added phenol-stabilized toluylene diisocyanate so that the resin content may become 40% by weight. Thus, an epoxy resin paint is obtained.

PREPARATION EXAMPLE 6

Self-bondable paint

In 165 parts by weight of dimethylformamide are dissolved uniformly 100 parts by weight of a phenoxy resin having a molecular weight of 30,000 (PKHH manufactured by Union Carbide Corp. in U.S.A.) represented by the formula

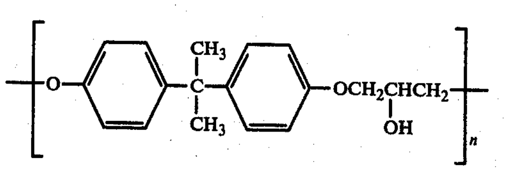

and 30 parts by weight of a stabilized isocyanate (Suprasec 5250 manufactured by Imperial Chemical Industries, Ltd. in U.K., isocyanate equivalent 350) represented by the formula

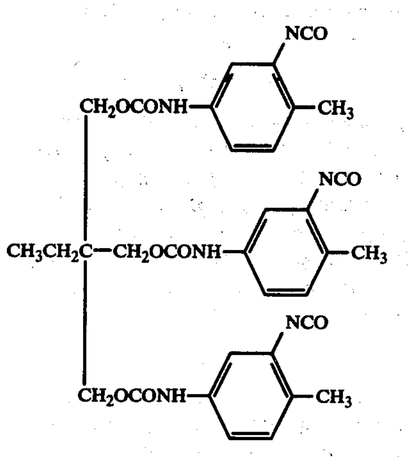

to prepare a paint.

PREPARATION EXAMPLE 7

Self-bordable paint

In 350 parts by weight of dimethylformamide is dissolved uniformly 100 parts by weight of a phenoxy resin having a molecular weight of 30,000 (PKHH manufactured by Union Carbide Corp. in U.S.A.). Then, 3 parts by weight of boron trifluoride monoethylamine salt ($BF_3$-400 manufactured by Hashimoto Kasei) represented by the formula $BF_3$-$CH_3CH_2NH_2$ is added at room temperature and dissolved uniformly. Then, 50 parts by weight of a novolac-type epoxy resin (ECN-1273 manufactured by CIBA Chemical & Dye Co. in U.S.A., epoxy equivalent 225) represented by the formula

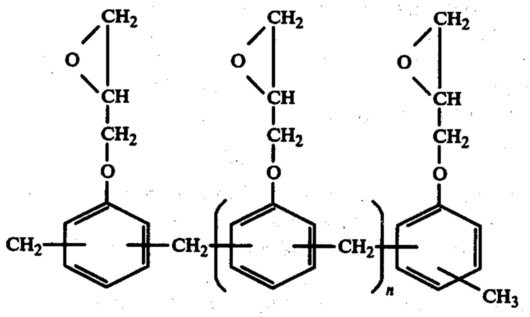

is added in small portions and dissolved uniformly. Thus, a paint is obtained.

PREPARATION EXAMPLE 8

Self-bondable paint

In 350 parts by weight of dimethylformamide is dissolved uniformly 100 parts by weight of a phenoxy resin having a molecular weight of 30,000 (PKHH manufactured by Union Carbide Corp. in U.S.A.). Then, 3 parts by weight of boron trifluoride monoethylamine salt ($BF_3$-400 manufactured by Hashimoto Kasei) is added at room temperature and dissolved uniformly. Then, 100 parts by weight of a novolac-type epoxy resin (ECN-1273 manufactured by CIBA Chemical & Dye Co. in U.S.A., epoxide equivalent 225) and 60 parts by weight of an aliphatic epoxy resin having an ether bond (DER-732 manufactured by Dow Corning Corp. in U.S.A., epoxide equivalent 190) represented by the formula

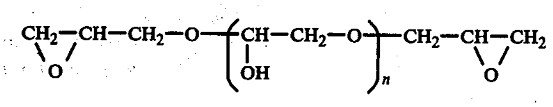

are added in small portions and dissolved uniformly. Thus, a paint is prepared.

A process for coating and baking onto a conductor the above-mentioned resins forming the respective layers is illustrated below.

EXAMPLE 1

The polyimide varnish (polyamic acid varnish) obtained in Preparation Example 1 is coated and baked onto a rectangular copper wire of 1.6 mm in thickness and 8.0 mm in width according to a usual method. After the formation of a polyimide resin layer, the polyvinyl formal varnish of Preparation Example 4 is likewise coated and baked to form a polyvinyl formal resin insulating layer. The baking temperature is 400° C. and the delivery speed is 4 m/min. The self-bondable paint of Preparation Example 6 is then coated twice according to a usual method. Baking is carried out at 250° C. and at a delivery speed of 5 m/min to obtain a rectangular enameled wire.

EXAMPLE 2

The polyamideimide varnish of Preparation Example 2 is coated and baked (at 400° C. and a delivery speed of 4 m/min) onto a rectangular copper wire of 1.6 mm in thickness and 8.0 mm in width according to a usual method. After the formation of a polyamideimide resin layer, the polyvinyl formal varnish of Preparation Example 4 and the self-bondable paint of Preparation Example 6 are coated and baked in the same manner as in Example 1 to obtain a rectangular enameled wire.

EXAMPLE 3

The polyesterimide varnish of Preparation Example 3 is coated and baked (at 400° C. and a delivery speed of 4 m/min) onto a rectangular copper wire of 1.6 mm in thickness and 8.0 mm in width according to a usual method. After the formation of a polyesterimide resin layer, the polyvinyl formal varnish of Preparation Example 4 and the self-bondable paint of Preparation Example 6 are coated and baked in the same manner as in Example 1 to obtain a rectangular enameled wire.

EXAMPLE 4

The polyimide varnish (polyamic acid varnish) of Preparation Example 1 is coated and baked (at 400° C. and a delivery speed of 4 m/min) onto a rectangular copper wire of 1.6 mm in thickness and 8.0 mm in width according to a usual method. After the formation of a polyimide resin layer, the epoxy paint of Preparation Example 5 is likewise coated and baked (at 400° C. and a delivery speed of 4 m/min) to form an epoxy resin insulating layer. Thereafter, the self-bondable paint of Preparation Example 6 is coated twice and baked according to a usual method. Thus, a rectangular enameled wire is obtained.

EXAMPLE 5

The polyamideimide varnish of Preparation Example 2 is coated and baked (at 400° C. and a delivery speed of 4 m/min) onto a rectangular copper wire of 1.6 mm in thickness and 8.0 mm in width according to a usual method. After the formation of a polyamideimide resin layer, the epoxy paint of Preparation Example 5 and the self-bondable paint of Preparation Example 6 are coated and baked in the same manner as in Example 4 to obtain a rectangular enameled wire.

EXAMPLE 6

The polyesterimide varnish of Preparation Example 3 is coated and baked onto a rectangular copper wire of 1.6 mm in thickness and 8.0 mm in width according to a usual method. After the formation of a polyesterimide resin layer, the epoxy paint of Preparation Example 5 and the self-bondable paint of Preparation Example 6 are coated and baked in the same manner as in Example 4 to obtain a rectangular enameled wire.

EXAMPLE 7

In the same manner as in Example 1, a polyimide resin layer is formed on a rectangular copper wire of 1.6 mm in thickness and 8.0 mm in width and a polyvinyl formal insulating resin layer is then formed. Thereafter, the self-bondable paint of Preparation Example 7 is coated twice according to a usual method and baked at 250° C. and a delivery speed of 5 m/min. Thus, a rectangular enameled wire is obtained.

EXAMPLE 8

In the same manner as in Example 2, a polyamideimide resin layer is formed on a rectangular copper wire of 1.6 mm in thickness and 8.0 mm in width, and the polyvinyl formal varnish of Preparation Example 4 and the self-bondable paint of Preparation Example 7 are then coated and baked in the same manner as in Example 7. Thus, a rectangular enameled wire is obtained.

EXAMPLE 9

In the same manner as in Example 3, a polyesterimide resin layer is formed on a rectangular copper wire of 1.6 mm in thickness and 8.0 mm in width. Then, the polyvinyl formal varnish of Preparation Example 4 and the self-bondable paint of Preparation Example 7 are coated and baked in the same manner as in Example 8. Thus, a rectangular enameled wire is obtained.

EXAMPLE 10

In the same manner as in Example 4, a polyimide resin layer is formed on a rectangular copper wire of 1.6 mm in thickness and 8.0 mm in width, and an epoxy resin insulating layer is then formed. Thereafter, the self-bondable paint of Preparation Example 7 is coated and baked in the same manner as in Example 7. Thus, a rectangular enameled wire is obtained.

EXAMPLE 11

In the same manner as in Example 5, a polyamideimide resin layer is formed on a rectangular copper wire of 1.6 mm in thickness and 8.0 mm in width. Then, the epoxy paint of Preparation Example 5 and the self-bondable paint of Preparation Example 7 are coated and baked in the same manner as in Example 10. Thus, a rectangular enameled wire is obtained.

EXAMPLE 12

In the same manner as in Example 6, a polyesterimide resin layer is formed on a rectangular copper wire of 1.6 mm in thickness and 8.0 mm in width. Then, the epoxy paint of Preparation Example 5 and the self-bondable paint of Preparation Example 7 are coated and baked in the same manner as in Example 10. Thus, a rectangular enameled wire is obtained.

EXAMPLE 13

In the same manner as in Example 1, a polyimide resin layer is formed on a rectangular copper wire of 1.6 mm in thickness and 8.0 mm in width, and a polyvinyl formal resin insulating layer is then formed. Thereafter, the self-bondable paint of Preparation Example 8 is coated twice according to a usual method and baked at 250° C. and a delivery speed of 5 m/min. Thus, a rectangular enameled wire is obtained.

EXAMPLE 14

In the same manner as in Example 2, a polyamideimide resin layer is formed on a rectangular copper wire of 1.6 mm in thickness and 8.0 mm in width. Then, the polyvinyl formal varnish of Preparation Example 4 and the self-bondable paint of Preparation Example 8 are coated and baked in the same manner as in Example 13. Thus, a rectangular enameled wire is obtained.

EXAMPLE 15

In the same manner as in Example 3, a polyesterimide resin layer is formed on a rectangular copper wire of 1.6 mm in thickness and 8.0 mm in width. Then, the polyvinyl formal varnish of Preparation Example 4 and the self-bondable paint of Preparation Example 8 are coated and baked in the same manner as in Example 14. Thus, a rectangular enameled wire is obtained.

EXAMPLE 16

In the same manner as in Example 4, a polyimide resin layer is formed on a rectangular copper wire of 1.6 mm in thickness and 8.0 mm in width, and an epoxy resin insulating layer is formed. Thereafter, the self-bondable paint of Preparation Example 8 is coated and baked in the same manner as in Example 13. Thus, a rectangular enameled wire is obtained.

EXAMPLE 17

In the same manner as in Example 5, a polyamideimide resin layer is formed on a rectangular copper wire of 1.6 mm in thickness and 8.0 mm in width. Then, the epoxy paint of Preparation Example 5 and the self-bondable paint of Preparation Example 8 are coated and baked in the same manner as in Example 16. Thus, a rectangular enameled wire is obtained.

EXAMPLE 18

In the same manner as in Example 6, a polyesterimide resin layer is formed on a rectangular copper wire of 1.6 mm in thickness and 8.0 mm in width. Then, the epoxy paint of Preparation Example 5 and the self-bondable paint of Preparation Example 8 are coated and baked in the same manner as in Example 16. Thus, a rectangular enameled wire is obtained.

EXAMPLE 19

In the same manner as in Example 2, a polyamideimide resin layer is formed on a rectangular copper wire of 1.6 mm in thickness and 8.0 mm in width. Then, the polyvinyl formal varnish of Preparation Example 4 and the self-bondable paint of Preparation Example 6 are coated and baked in the same manner as in Example 2 to obtain a rectangular enameled wire.

EXAMPLE 20

In the same manner as in Example 8, a polyamideimide resin layer is formed on a rectangular copper wire of 1.6 mm in thickness and 8.0 mm in width. Then, the polyvinyl formal varnish of Preparation Example 4 and the self-bondable paint of Preparation Example 7 are coated and baked in the same manner as in Example 8 to obtain a rectangular enameled wire.

EXAMPLE 21

In the same manner as in Example 14, a polyamideimide resin layer is formed on a rectangular copper wire of 1.6 mm in thickness and 8.0 mm in width. Then, the polyvinyl formal varnish of Preparation Example 4 and the self-bondable paint of Preparation Example 8 are coated and baked in the same manner as in Example 14 to obtain a rectangular enameled wire.

EXAMPLE 22

In the same manner as in Example 2, a polyamideimide resin layer is formed on a rectangular copper wire of 1.6 mm in thickness and 8.0 mm in width. Then, the polyvinyl formal varnish of Preparation Example 4 and the self-bondable paint of Preparation Example 6 are coated and baked in the same manner as in Example 2 to obtain a rectangular enameled wire.

EXAMPLE 23

In the same manner as in Example 5, a polyamideimide resin layer is formed on a rectangular copper wire of 1.6 mm in thickness and 8.0 mm in width. Then, the epoxy paint of Preparation Example 5 and the self-bondable paint of Preparation Example 6 are coated and baked in the same manner as in Example 5 to obtain a rectangular enameled wire.

EXAMPLE 24

In the same manner as in Example 1, a polyamideimide resin layer is formed on a rectangular copper wire of 1.6 mm in width. Then, the polyvinyl formal varnish of Preparation Example 4 and the self-bondable paint of Preparation Example 6 are coated and baked in the same manner as in Example 1 to obtain a rectangular enameled wire.

COMPARATIVE EXAMPLE 1

The polyvinyl formal varnish of Preparation Example 4 is coated and baked onto a rectangular copper wire of 1.6 mm in thickness and 8.0 mm in width according to a usual method. Further, the self-bondable paint of Preparation Example 6 is coated twice and baked in the same manner as in Example 1.

COMPARATIVE EXAMPLE 2

The polyamideimide varnish of Preparation Example 2 is coated and baked onto a rectangular copper wire of 1.6 mm in thickness and 8.0 mm in width according to a usual method. Further, the self-bondable paint of Preparation Example 6 is coated twice and baked in the same mamner as in Example 1.

COMPARATIVE EXAMPLE 3

The polyvinyl formal varnish of Preparation Example 4 is coated and baked onto a rectangular copper wire of 1.6 mm in thickness and 8.0 mm in width according to a usual method. Further, the self-bondable paint of Preparation Example 7 is coated twice and baked in the same manner as in Example 7.

COMPARATIVE EXAMPLE 4

The polyamideimide varnish of Preparation Example 2 is coated and baked onto a rectangular copper wire of 1.6 mm in thickness and 8.0 mm in width according to a usual method. Further, the self-bondable paint of Preparation Example 7 is coated twice and baked in the same manner as in Example 7.

COMPARATIVE EXAMPLE 5

The polyvinyl formal varnish of Preparation Example 4 is coated and baked onto a rectangular copper wire of 1.6 mm in thickness and 8.0 mm in width according to a usual method. Further, the self-bondable paint of Preparation Example 8 is coated twice and baked in the same manner as in Example 13.

COMPARATIVE EXAMPLE 6

The polyamideimide varnish of Preparation Example 2 is coated and baked onto a rectangular copper wire of 1.6 mm in thickness and 8.0 mm in width according to a usual method. Further, the self-bondable paint of Preparation Example 8 is coated twice and baked in the same manner as in Example 13.

The rectangular enameled wires obtained in Examples 1–24 and Comparative Examples 1–6 each are cut into pieces of 60 mm in length. Each two pieces are superposed on each other at an adhesion length of 20 mm, that is, at an adhesion area of 1.6 $cm^2$, pressed down under a pressure of 5 $kg/cm^2$, and then cured at 110° C. for 96 hours in the case of Examples 1–6, 19 and 22–24 and Comparative Examples 1–2 and at 130° C. for 24 hours in the case of Examples 7–18 and 20–21 and Comparative Examples 3–6. The adhesive strength (shearing strength) of each assembly thus cured is measured. Also, the rectangular enameled wires are simultaneously cut into pieces of 300 mm in length. Each three pieces are superposed, pressed down under a pressure of 5 $kg/cm^2$, and then cured at 110° C. for 96 hours in the case of Examples 1–6 and Comparative Examples 1–2 and at 130° C. for 24 hours in the case of Examples 7–18 and Comparative Examples 3–6. The bending strength (bending load on 2% plastic deformation) of each assembly thus cured is measured. Further, these test pieces are heated in a mineral oil at 140° C. for 60 days (1440 hours), and the adhesive strength and bending strength of the test pieces thus heated are measured.

The thickness of the respective resin insulating layers coated and baked is shown in Tables 1–3. The measurement results of adhesive strength and bending strength are shown in Tables 4–6. Also, as reference values, the results of the same tests for a rectangular copper wire of 1.6 mm in thickness and 8.0 mm in width are shown in Tables 4–6. Further, the measurement results of adhesive strength of the rectangular enameled wires obtained in Examples 19–24 are shown in Tables 7–8.

Table 1

| Thickness of each resin layer (mm) | | | Ex. 1 | Ex. 2 | Ex. 3 | Ex. 4 | Ex. 5 | Ex.6 | C. Ex. 1 | C. Ex. 2 |
|---|---|---|---|---|---|---|---|---|---|---|
| | Polyimide | W | 0.011 | — | — | 0.012 | — | — | — | — |
| | resin | T | 0.009 | | | 0.010 | | | | |
| First | Polyamideimide | W | — | 0.013 | — | — | 0.012 | — | — | 0.066 |
| layer | resin | T | | 0.010 | | | 0.011 | | | 0.054 |
| | Polyesterimide | W | — | — | 0.012 | — | — | 0.011 | — | — |
| | resin | T | | | 0.010 | | | 0.009 | | |
| | Polyvinyl | W | 0.044 | 0.045 | 0.042 | — | — | — | 0.060 | — |
| Inter-mediate | formal resin | T | 0.036 | 0.036 | 0.033 | | | | 0.055 | |
| layer | Epoxy resin | W | — | — | — | 0.047 | 0.044 | 0.045 | — | — |
| | | T | | | | 0.039 | 0.035 | 0.035 | | |
| Outermost | Self-bondable resin | W | 0.050 | 0.052 | 0.050 | 0.053 | 0.051 | 0.050 | 0.050 | 0.051 |
| layer | (Preparation Example 6) | T | 0.032 | 0.031 | 0.031 | 0.032 | 0.031 | 0.029 | 0.034 | 0.033 |

Notes:
Ex.: Example
C. Ex.: Comparative Example
W: Width direction
T: Thickness direction Table 2

| Thickness of each resin layer (mm) | | | Ex. 7 | Ex. 8 | Ex. 9 | Ex. 10 | Ex. 11 | Ex. 12 | C. Ex. 3 | C. Ex. 4 |
|---|---|---|---|---|---|---|---|---|---|---|
| | Polyimide | W | 0.011 | — | — | 0.012 | — | — | — | — |
| | resin | T | 0.009 | | | 0.010 | | | | |
| First | Polyamideimide | W | — | 0.013 | — | — | 0.012 | — | — | 0.066 |
| layer | resin | T | | 0.010 | | | 0.011 | | | 0.054 |
| | Polyesterimide | W | — | — | 0.012 | — | — | 0.011 | — | — |
| | resin | T | | | 0.010 | | | 0.009 | | |
| | Polyvinyl | W | 0.044 | 0.045 | 0.042 | — | — | — | 0.060 | — |
| Inter-mediate | formal resin | T | 0.036 | 0.036 | 0.033 | | | | 0.055 | |
| layer | Epoxy resin | W | — | — | — | 0.047 | 0.044 | 0.045 | — | — |
| | | T | | | | 0.039 | 0.035 | 0.035 | | |
| Outermost | Self-bondable resin | W | 0.052 | 0.051 | 0.053 | 0.051 | 0.050 | 0.052 | 0.052 | 0.053 |
| layer | (Preparation Example 7) | T | 0.033 | 0.031 | 0.032 | 0.030 | 0.029 | 0.031 | 0.031 | 0.032 |

Notes:
Ex.: Example
C. Ex.: Comparative Example
W: Width direction
T: Thickness direction Table 3

| Thickness of each resin layer (mm) | | | Ex. 13 | Ex. 14 | Ex. 15 | Ex. 16 | Ex. 17 | Ex. 18 | C. Ex. 5 | C. Ex. 6 |
|---|---|---|---|---|---|---|---|---|---|---|
| | Polyimide | W | 0.011 | — | — | 0.012 | — | — | — | — |
| | resin | T | 0.009 | | | 0.010 | | | | |
| First | Polyamideimide | W | — | 0.013 | — | — | 0.012 | — | — | 0.066 |
| layer | resin | T | | 0.010 | | | 0.011 | | | 0.054 |
| | Polyesterimide | W | — | — | 0.012 | — | — | 0.011 | — | — |
| | resin | T | | | 0.010 | | | 0.009 | | |
| | Polyvinyl | W | 0.044 | 0.045 | 0.042 | — | — | — | 0.060 | — |
| Inter-mediate | formal resin | T | 0.036 | 0.036 | 0.033 | | | | 0.055 | |
| layer | Epoxy resin | W | — | — | — | 0.047 | 0.044 | 0.045 | — | — |
| | | T | | | | 0.039 | 0.035 | 0.035 | | |
| Outermost | Self-bondable resin | W | 0.053 | 0.052 | 0.052 | 0.050 | 0.051 | 0.053 | 0.052 | 0.051 |
| layer | (Preparation Example 8) | T | 0.032 | 0.031 | 0.032 | 0.031 | 0.030 | 0.030 | 0.033 | 0.032 |

Notes:
Ex.: Example
C. Ex.: Comparative Example
W: Width direction
T: Thick direction Table 4

| | Initial | | After heating in mineral oil | |
|---|---|---|---|---|
| Sample | Adhesive strength ($kg/cm^2$) | Bending strength (kg) | Adhesive strength ($kg/cm^2$) | Bending strength (kg) |
| Example 1 | 57 | 72 | 43 | 70 |
| Example 2 | 58 | 70 | 41 | 75 |
| Example 3 | 55 | 68 | 39 | 67 |
| Example 4 | 58 | 69 | 41 | 72 |
| Example 5 | 57 | 71 | 39 | 68 |
| Example 6 | 53 | 66 | 37 | 61 |
| Comparative Example 1 | 15 | 47 | 7 | 39 |
| Comparative | | | | |

Table 4-continued

| Sample | Initial: Adhesive strength (kg/cm$^2$) | Initial: Bending strength (kg) | After heating in mineral oil: Adhesive strength (kg/cm$^2$) | After heating in mineral oil: Bending strength (kg) |
|---|---|---|---|---|
| Example 2 | 35 | 56 | 12 | 43 |
| Reference value | — | 35 | — | 35 |

Notes:
1) Measuring temperature: 110° C
2) Heating in mineral oil: At 140° C for 60 days (1440 hours)

Table 5

| Sample | Initial: Adhesive strength (kg/cm$^2$) | Initial: Bending strength (kg) | After heating in mineral oil: Adhesive strength (kg/cm$^2$) | After heating in mineral oil: Bending strength (kg) |
|---|---|---|---|---|
| Example 7 | 99 | 91 | 85 | 78 |
| Example 8 | 96 | 89 | 81 | 74 |
| Example 9 | 93 | 87 | 79 | 73 |
| Example 10 | 97 | 86 | 79 | 72 |
| Example 11 | 93 | 85 | 77 | 70 |
| Example 12 | 92 | 85 | 78 | 72 |
| Comparative Example 3 | 30 | 67 | 9 | 47 |
| Comparative Example 4 | 46 | 74 | 16 | 54 |
| Reference value | — | 35 | — | 35 |

Notes:
1) Measuring temperature: 110° C
2) Heating in mineral oil: At 140° C for 60 days (1440 hours)

Table 6

| Sample | Initial: Adhesive strength (kg/cm$^2$) | Initial: Bending strength (kg) | After heating in mineral oil: Adhesive strength (kg/cm$^2$) | After heating in mineral oil: Bending strength (kg) |
|---|---|---|---|---|
| Example 13 | 112 | 105 | 96 | 92 |
| Example 14 | 109 | 104 | 97 | 91 |
| Example 15 | 108 | 101 | 95 | 87 |
| Example 16 | 106 | 102 | 91 | 84 |
| Example 17 | 104 | 101 | 93 | 90 |
| Example 18 | 102 | 100 | 90 | 82 |
| Comparative Example 5 | 36 | 78 | 11 | 56 |
| Comparative Example 6 | 54 | 89 | 23 | 63 |
| Reference value | — | 35 | — | 35 |

Notes:1) Measuring temperature: 110° C
2) Heating in mineral oil: At 140° C for 60 days (1440 hours)

Table 7

| Ex. | Thickness of each resin layer (mm): First layer | Intermediate layer | Outermost layer | Adhesive strength (kg/cm$^2$) |
|---|---|---|---|---|
| | | | W 0.018 | 18 |
| | | | T 0.010 | |
| | | | W 0.022 | 32 |
| | | | T 0.013 | |
| 19 | W 0.013 | W 0.045 | W 0.026 | 48 |
| | T 0.010 | T 0.036 | T 0.016 | |
| | | | W 0.038 | 54 |
| | | | T 0.023 | |
| | | | W 0.052 | 58 |
| | | | T 0.031 | |
| | | | W 0.017 | 20 |
| | | | T 0.010 | |
| | | | W 0.022 | 52 |
| | | | T 0.013 | |
| 20 | W 0.013 | W 0.045 | W 0.026 | 79 |
| | T 0.010 | T 0.036 | T 0.016 | |
| | | | W 0.038 | 92 |
| | | | T 0.023 | |
| | | | W 0.051 | 96 |
| | | | T 0.031 | |
| | | | W 0.018 | 39 |
| | | | T 0.010 | |
| | | | W 0.022 | 60 |
| | | | T 0.013 | |
| 21 | W 0.013 | W 0.045 | W 0.026 | 93 |
| | T 0.010 | T 0.036 | T 0.016 | |
| | | | W 0.038 | 105 |
| | | | T 0.023 | |
| | | | W 0.052 | 109 |

Table 7-continued

| Ex. | Thickness of each resin layer (mm): First layer | Intermediate layer | Outermost layer | Adhesive strength (kg/cm$^2$) |
|---|---|---|---|---|
| | | | T 0.031 | |

Notes:
W: Width direction
T: Thickness direction
Measuring temperature: 110° C

Table 8

| Ex. | Thickness of each resin layer (mm): First layer W | First layer T | Intermediate layer W | Intermediate layer T | Outermost layer W | Outermost layer T | Adhesive strength (kg/cm$^2$) |
|---|---|---|---|---|---|---|---|
| | 0.002 | 0.002 | 0.056 | 0.044 | 0.051 | 0.031 | 24 |
| | 0.003 | 0.002 | 0.053 | 0.043 | 0.052 | 0.030 | 30 |
| 22 | 0.006 | 0.005 | 0.051 | 0.040 | 0.052 | 0.030 | 50 |
| | 0.013 | 0.010 | 0.045 | 0.036 | 0.052 | 0.031 | 58 |
| | 0.026 | 0.021 | 0.031 | 0.025 | 0.051 | 0.030 | 59 |
| | 0.002 | 0.002 | 0.054 | 0.044 | 0.051 | 0.030 | 23 |
| | 0.003 | 0.002 | 0.054 | 0.044 | 0.051 | 0.031 | 29 |
| 23 | 0.006 | 0.005 | 0.052 | 0.043 | 0.052 | 0.032 | 49 |
| | 0.012 | 0.011 | 0.044 | 0.035 | 0.051 | 0.031 | 57 |
| | 0.025 | 0.021 | 0.030 | 0.025 | 0.053 | 0.032 | 60 |
| | 0.002 | 0.002 | 0.054 | 0.044 | 0.051 | 0.031 | 26 |
| | 0.003 | 0.002 | 0.052 | 0.043 | 0.052 | 0.032 | 31 |
| 24 | 0.006 | 0.005 | 0.050 | 0.040 | 0.051 | 0.031 | 51 |
| | 0.011 | 0.009 | 0.044 | 0.036 | 0.050 | 0.032 | 57 |

Table 8-continued

| | Thickness of each resin layer (mm) | | | | | | |
|---|---|---|---|---|---|---|---|
| | First layer | | Intermediate layer | | Outermost layer | | Adhesive strength |
| Ex. | W | T | W | T | W | T | ($kg/cm^2$) |
| | 0.026 | 0.021 | 0.052 | 0.026 | 0.050 | 0.031 | 60 |

Notes:
W: Width direction
T: Thickness direction
Measuring temperature: 110° C

As is clear from the results of Tables 4–6, polyvinyl formal-insulated wires (Comparative Examples 1, 3 and 5), which have heretofore been said to be excellent in oil resistance, show good results in both adhesive strength and bending strength before heating in a mineral oil but the characteristics are deteriorated after heating in a mineral oil since their heat resistance and oil resistance are not satisfactory. Polyamideimide-insulated wires (Comparative Examples 2, 4 and 6) are excellent in heat resistance and oil resistance but poor in adhesive property. On the other hand, in Examples 1–24 of the present invention, a varnish which is excellent in heat resistance and oil resistance is used as the first layer and a varnish which is excellent in adhesiveness between the first layer and the self-bondable layer is used as the intermediate layer. Thereby, the self-bondable insulated wires obtained in these examples show excellent characteristics and all have a bending strength at least 1.5 times as high as the reference value (the bending strength of the conductor) before heating in a mineral oil, and their characteristics are not so deteriorated, maintain at least 50% of the initial adhesive strength, and maintain a bending strength at least 1.5 times as high as the reference value even after heating in a mineral oil.

Thus, a rectangular enameled wire which is excellent in both heat resistance and oil resistance can be obtained by coating and baking onto a rectangular copper wire any one of a polyimide resin, a polyamideimide resin and a polyesterimide resin as the first layer and any one of a polyvinyl formal resin and an epoxy resin as the intermediate layer, and providing a self-bondable layer formed with a phenoxy resin as the outermost layer. Also, as is clear from the results of Table 7, a self-bondable insulated wire having a high adhesive strength can be obtained by increasing the thickness (width direction) of the outermost self-bondable layer to 0.021 mm or more. Further, as is clear from the results of Table 8, it is preferable that a ratio of the thickness of the first layer to that of the intermediate layer is at least 5:95. On the other hand, if the ratio of the thickness of the first layer to that of the intermediate layer is 45:55 or less, it is economically advantageous. Therefore, the preferable ratio of the thickness of the first layer to that of the intermediate layer is 5:95 to 45:55. Particularly, when the ratio is 10:90 to 35:65, an excellent rectangular enameled wire can be obtained.

What is claimed is:

1. A self-bondable insulated wire comprising a conductor and three resin insulating layers, wherein the first resin insulating layer, the layer adjacent said conductor, is formed with a resin selected from the group consisting of polyimide resins, polyamideimide resins and polyesterimide resins, the intermediate resin insulating layer is formed with a resin selected from the group consisting of polyvinyl formal resins and epoxy resins, and the outermost resin insulating layer is formed with a self-bondable resin of phenoxy series.

2. A self-bondable insulated wire according to claim 1, wherein the thickness of the outermost resin insulating layer is at least 0.02 mm.

3. A self-bondable insulated wire according to claim 1, wherein the first resin insulating layer is formed with a polyamideimide resin and the intermediate resin insulating layer is formed with a polyvinyl formal resin.

4. A self-bondable insulated wire according to claim 3, wherein the thickness of the outermost resin insulating layer is at least 0.02 mm.

5. A self-bondable insulated wire according to claim 2, wherein a ratio of the thickness of the first resin insulating layer to that of the intermediate resin insulating layer is 5–45:95–55.

6. A self-bondable insulated wire according to claim 5, wherein a ratio of the thickness of the first resin insulating layer to that of the intermediate resin insulating layer is 10–35:90–65.

7. A self-bondable insulated wire according to claim 5, wherein the thickness of the outermost resin insulating layer is at least 0.02 mm.

8. A self-bondable insulated wire according to claim 1, wherein a ratio of the thickness of the first resin insulating layer to that of the intermediate resin insulating layer is 5–45:95–55.

9. A self-bondable insulated wire according to claim 8, wherein a ratio of the thickness of the first resin insulating layer to that of the intermediate resin insulating layer is 10–35:90–65.

10. A self-bondable insulated wire according to claim 8, wherein the thickness of the outermost resin insulating layer is at least 0.02 mm.

* * * * *